US012612288B2

(12) United States Patent

Haas et al.

(10) Patent No.: US 12,612,288 B2

(45) Date of Patent: Apr. 28, 2026

(54) LASHING DEVICE WITH ADJUSTMENT MECHANISM WHICH HAS A SEPARATE CAM CARRIER

(71) Applicant: RUD KETTEN RIEGER & DIETZ GMB U. CO. KG, Aalen (DE)

(72) Inventors: Simon Haas, Goggingen-Horn (DE); Michael Betzler, Abtsgmund (DE)

(73) Assignee: RUD KETTEN RIEGER & DIETZ GMBH U. CO. KG (DE)

( * ) Notice: Subject to any disclaimer, the term of this patent is extended or adjusted under 35 U.S.C. 154(b) by 874 days.

(21) Appl. No.: 17/995,647

(22) PCT Filed: Apr. 7, 2021

(86) PCT No.: PCT/EP2021/059104

§ 371 (c)(1),
(2) Date: Oct. 6, 2022

(87) PCT Pub. No.: WO2021/204899

PCT Pub. Date: Oct. 14, 2021

(65) Prior Publication Data

US 2023/0117412 A1 Apr. 20, 2023

(30) Foreign Application Priority Data

Apr. 7, 2020 (DE) ..................... 10 2020 204 490.2

(51) Int. Cl.
*B66C 1/66* (2006.01)
*B60P 7/08* (2006.01)
*F16G 15/08* (2006.01)

(52) U.S. Cl.
CPC .............. *B66C 1/66* (2013.01); *B60P 7/0807* (2013.01); *F16G 15/08* (2013.01)

(58) Field of Classification Search
CPC .. B66C 13/06; B66C 1/16; B66C 1/66; F16D 59/02; F16D 65/09
See application file for complete search history.

(56) References Cited

U.S. PATENT DOCUMENTS 2,124,912 A * 7/1938 Ehmann .................. F16G 15/06
411/956
3,492,033 A * 1/1970 Mueller ................ F16C 11/045
294/215

(Continued)

FOREIGN PATENT DOCUMENTS

DE 3822690 C1 3/1990
DE 102016103050 A1 8/2017

(Continued)

OTHER PUBLICATIONS

International Search Report issued in PCT/EP2021/059104, dated Jul. 19, 2021.

(Continued)

*Primary Examiner* — Howard J Sanders
(74) *Attorney, Agent, or Firm* — BARNES & THORNBURG LLP; Jeffrey R. Stone

(57) ABSTRACT

The invention relates to a slinging device (1) with a base part (2) and with a hoop part (6) which is attached to the base part (2) so as to be pivotable relative to the base part (2) about a pivot axis (4) which hoop part serves for the slinging of a slinging, load-securing, tensioning or lifting means (28). The slinging device (1) is equipped with an adjustment mechanism (40) which has at least one hoop deflection cam (46, 46*a*, 46*b*) and at least one brake probe (42) which, with the pivoting movement (8) of the hoop part (6) relative to the base part (2), passes across the hoop deflection cam at least in certain sections at at least one deflection position (47, 47*a*, 47*b*). The adjustment mechanism generates a deflection force (50) which increases with decreasing distance from the (Continued)

at least one deflection position and which is directed counter to the pivoting movement (8). The deflection force makes it more difficult to move the hoop part (6) into the deflection position. In order to be able to easily and inexpensively adapt the slinging device (1) to different usage requirements, it is provided according to the invention that the hoop deflection cam (46, 46*a*, 46*b*) is arranged on a separate cam carrier (44) which is attached to the base part (2) or hoop part (6).

15 Claims, 1 Drawing Sheet

(56)                References Cited

U.S. PATENT DOCUMENTS

| 5,114,260 | A | * | 5/1992 | Hart | F16G 15/06 |
| | | | | | 403/24 |
| 5,433,547 | A | * | 7/1995 | Hart | F16B 39/32 |
| | | | | | 403/24 |
| 6,547,474 | B1 | * | 4/2003 | Smetz | B66C 1/66 |
| | | | | | 403/150 |
| 7,540,140 | B1 | * | 6/2009 | Diaz | F16G 15/06 |
| | | | | | 70/52 |
| 9,086,118 | B2 | * | 7/2015 | Campbell | F16G 15/06 |
| 10,724,559 | B2 | * | 7/2020 | Heaphy | E02F 3/58 |
| 11,186,466 | B2 | * | 11/2021 | Haas | B66C 13/06 |
| 12,246,951 | B1 | * | 3/2025 | Burian | B66C 1/66 |
| 2004/0032134 | A1 | * | 2/2004 | Hageman | B66C 1/66 |
| | | | | | 294/215 |
| 2012/0061982 | A1 | * | 3/2012 | Davidson | B66C 1/10 |
| | | | | | 72/352 |

FOREIGN PATENT DOCUMENTS

| DE | 102018213825 | A1 | | 2/2020 | |
| DE | 102018213827 | A1 | | 2/2020 | |
| EP | 2646698 | B1 | * | 8/2015 | F16B 45/002 |
| JP | 2000055141 | A | * | 2/2000 | |
| JP | 2001208033 | A | * | 8/2001 | |
| KR | 20240178839 | A | * | 12/2024 | F16G 15/06 |
| TW | M306429 | U | | 2/2007 | |
| WO | 2015/004124 | A1 | | 1/2015 | |

OTHER PUBLICATIONS

First Office Action issued by the Chinese Patent Office, application No. 202180022321.0, issuing date Mar. 24, 2025. For information purposes only.

Office Action issued by the European Patent Office in application No. EP127300, dated Jan. 3, 2025. For informational purposes only.

Notice of Registration Procedures for TW 202180033432.0, dated Oct. 28, 2025.

* cited by examiner

LASHING DEVICE WITH ADJUSTMENT MECHANISM WHICH HAS A SEPARATE CAM CARRIER

The invention relates to a slinging device with a base part that is designed to be attachable to an object, such as a load or a loading surface, with a hoop part which is attached to the base part so as to be pivotable relative to the base part about a pivot axis for the slinging of a slinging, load-securing, tensioning or lifting means, and with an adjustment mechanism which has at least one hoop deflection cam and at least one brake probe which, with the pivoting movement of the hoop part relative to the base part, passes across the hoop deflection cam at least in certain sections at a deflection position, and which generates a deflection force which increases with decreasing distance from the at least one deflection position and which is directed counter to the pivoting movement.

Such slinging devices are known, for example, from DE 10 2018 213 825 A, and DE 10 2018 213 827 A. By means of the adjustment mechanism, the hoop part can be prevented from taking certain pivoting positions relative to the base part. In this manner, the hoop part can be prevented from falling onto the object under the influence of its weight and damaging the latter. The adjustment mechanism can also be used to prevent a sudden turning over of the hoop part under load if the hoop part has an inappropriate position and is oriented towards the load.

The object of the present invention is to improve the slinging devices mentioned in the beginning such that they can be manufactured at lower costs and simultaneously permit a greater diversity of variants.

This object is achieved according to the invention for the slinging device mentioned in the beginning by the hoop deflection cam being arranged on a separate cam carrier which is attached to the base part or hoop part.

Due to the cam carrier designed as a separate component, in the manufacture of the slinging device, hoop deflection cams can be easily attached to different positions and/or in different embodiments. One only has to use a different cam carrier, or the cam carrier has to be relocated. A structural change of the base part is no longer necessary. Thereby, the slinging device can be easily adapted to different purposes of application where different deflection positions are required.

The solution can be further improved by the following embodiments, each separately advantageous and combinable in any way.

For example, in a first advantageous embodiment, the cam carrier can be attached to the base part or the hoop part to be repeatedly releasable and/or exchangeable. The repeated releasability and/or exchangeability permits to dismount the cam carrier for maintenance purposes or, in different applications, to exchange it for other cam carriers. A repeated releasability and exchangeability can be achieved, for example, by a threaded joint, but also by a welding or solder connection that can be separated without damaging the base part or the hoop part.

The slinging device can in particular include a plurality of exchangeable cam carriers with differently shaped and/or differently positioned cams. This permits a user to adapt the slinging device to his or her own demands.

According to another embodiment, the cam carrier can be attachable to the base part or hoop part in different positions. In the different positions, the at least one hoop deflection cam can be located at a different deflection position.

A cam carrier can include a plurality of deflection positions. In particular, one hoop deflection cam can be associated with each deflection position, so that the cam carrier can include a plurality of deflection cams. The brake probe is elastically deflected at one hoop deflection cam.

According to a particularly advantageous embodiment, the cam carrier is fixed to the base part. Here, the cam carrier can be located at the side of the hoop part facing away from the base part in the direction of the pivot axis. Such an embodiment is in particular advantageous in large slinging devices, since with large structural sizes, no sufficient space is present between the base part and the hoop part due to the relatively large base part in such a case.

According to a further advantageous embodiment, the cam carrier can extend around the pivot axis at least in segments, in particular, however, in a closed manner. This embodiment facilitates the construction of the adjustment mechanism since the cam carrier extends along the pivoting movement in this embodiment.

The cam carrier can, according to a further advantageous embodiment, have the shape of a ring, in particular of a sleeve or a disk. The disk can overlap the hoop part at least in sections to secure the hoop part.

The hoop deflection cam can project from the cam carrier towards the base part in parallel to the pivot axis when the cam carrier is attached to the hoop part, or towards the hoop part when the cam carrier is attached to the base part. The deflection cam can in this case have an essentially undulating design, wherein the apex of the cam can be limited by two guide bevels. The apex does not have to be punctiform but can also form a plateau which extends over a region of the pivoting movement and along which the brake probe is deflected constantly.

If a deflection position and the cam associated with this deflection position are located at the end of the pivoting region of the hoop part, the deflection cam can also only include one single guide bevel.

The shape of the hoop deflection cam can be adapted to the respective purpose of the deflection position. If the deflection position is used as a brake, for example, a long guide bevel can be provided which gradually increases the deflection force.

The cam carrier can be fastened to a bearing journal of the base part carrying the hoop part. In particular, the cam carrier can be attached to a front face of the free end of the bearing journal, preferably in a torque-proof manner. Here, the front face preferably faces in the direction of the pivot axis. In this manner, the cam carrier can be easily accessed and dismounted from outside.

The brake probe and the cam carrier are resiliently pressed against each other at least in one region around the at least one deflection position. Here, at least the brake probe is elastically deformed or deflected, respectively. The deflection force is preferably caused by the resiliently generated pressure. The brake probe preferably includes a spring to this end. The brake probe can in particular include a leaf spring or be designed as a leaf spring. The brake probe can also be a resilient thrust piece, for example, in the form of a spring-tensioned ball.

The cam carrier can overlap a bearing that holds the hoop part so as to pivot around the base part, in particular over a bearing gap of this bearing.

The base part with the hoop part attached thereto can be fastened to a retaining bolt so as to be rotatable about an axis of rotation extending perpendicularly to the pivot axis. This makes it possible for the base part to independently orient itself to the force introduced on the hoop part via the slinging, load-securing, tensioning or lifting means.

According to a further advantageous embodiment, at least one deflection position can be located spaced apart from the ends of the pivoting region of the hoop part with respect to the base part. For example, at least one deflection position can be located centrally between the ends of the pivoting region. One deflection position can also be located at the point where a hoop plane extends in parallel to the axis of rotation.

A deflection position within the pivoting region preferably leads to the hoop part snapping over when it passes across the deflection position. When the hoop part approaches the deflection position, first of all, an increasing force has to be applied to overcome the deflection force, elastically deflect at least the brake probe and pivot the hoop part further in the direction of the deflection position. After the deflection position has been passed, the hoop part snaps over, and the hoop part is pushed away from the deflection position by the adjustment mechanism. The deflection force which increases as the deflection position is approached leads, during a pivoting movement away from the deflection point, to a force supporting the pivoting movement.

A snapping-over is improved by a hoop deflection cam that is short and steep in the pivoting direction, which additionally also leads to an exactly defined snapping-over.

One deflection position each can be located at one end of the pivoting region of the hoop part. At these deflection positions, the adjustment mechanism acts as a hoop falling brake which slows down the hoop part by the brake probe running onto the deflection cam before the ends of the pivoting region are reached. The hoop deflection cam can extend, in such an embodiment of each of the two ends, continuously from the one end to the other end of the pivoting movement.

The invention furthermore relates to an exchangeable cam carrier for a slinging point in one of the above described embodiments.

The invention will be illustrated more in detail below by way of example by one embodiment with reference to the enclosed drawings. For a better understanding, the same reference numerals are used herein in the drawings for elements corresponding to each other with respect to their functions and/or designs.

In accordance with the above illustrations, in the described embodiment, a feature can be omitted if the technical effect connected with this feature is not relevant for a certain application. Vice versa, a feature not contained in the described embodiment can be added if its technical effect is required in a certain application.

Figures 1, 2:
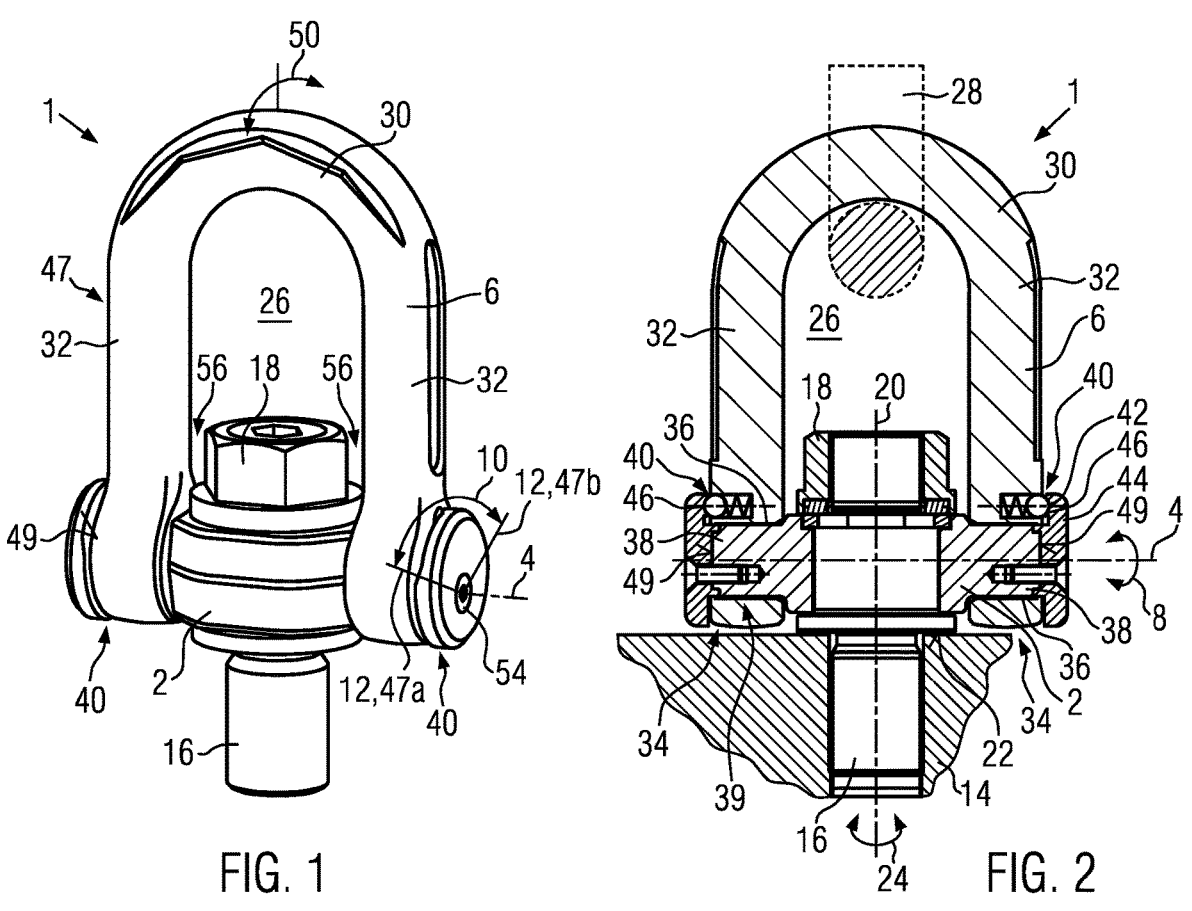
FIG. 1 shows a schematic perspective view of a slinging device.
FIG. 2 shows a schematic sectional view of the slinging device of FIG. 1.

First of all, the structure of a possible embodiment of a slinging device 1 is illustrated with reference to FIGS. 1 and 2.

The slinging device 1 includes a base part 2 and a hoop part 6 which is attached to the base part 2 so as to be pivotable relative to the base part 2 about a pivot axis 4. The pivoting movement of the hoop part 6 is schematically represented by an arrow 8 in FIG. 2. The pivoting movement 8 can be limited to a pivoting region 10 (FIG. 1) extending between the ends 12 of the pivoting movement 8. The pivoting region or pivoting angle 10 can be less than 180°.

The slinging device is attachable to an object 14 via the base part 2, for example to a load or a loading surface. To fasten the slinging device 1, a retaining bolt 16 can be provided which can be screwed into the object 14. The retaining bolt 16 can include a head. As an alternative, the base part 2 can be secured at the retaining bolt 16, and thus at the object 14, via a nut 18 screwed onto the retaining bolt 16.

The base part 2 is preferably rotatable about an axis of rotation 20 about the retaining bolt 16. The axis of rotation 20 in this case in particular extends perpendicularly to the pivot axis 4. The axis of rotation 20 can extend perpendicularly to an assembly plane 22 on which the slinging device 1 is seated in the state assembled to the object 14. The assembly plane 22 can extend in parallel to the pivot axis 4. The pivoting movement 24 is unrestricted, that means, the base part 2 together with the hoop part 6 can rotate about the axis of rotation 20 in an unlimited manner by any multiple of 360°.

The hoop part 6 forms an opening 26 and serves to sling a slinging, load-securing, tensioning or lifting means 28, for example a belt, a chain, a carbine, or a hook. The hoop part 6 includes a bent bow 30 that can pass over into two parallel, straight legs 32. Instead of the bent bow, a straight bow can also be present. The two legs 32 can be connected, spaced apart from the bow 30, in a region between the base part 2 and the bow 30, by a connector not represented here if the hoop part 6 is subjected to particularly high stresses. In the tongue-shaped, broadened ends 34 of the two legs 32, there is one opening 36 each through which a corresponding bearing journal 38 of the base part 2 projects. One opening 36 and one bearing journal 38 each form a bearing 39, here a sliding bearing for the pivoting movement 8. To prevent the hoop part 6 from taking one or several predetermined relative positions in the pivoting region 10 of the pivoting movement 8 relative to the base part 2, an adjustment mechanism 40 is provided.

Figure 3:
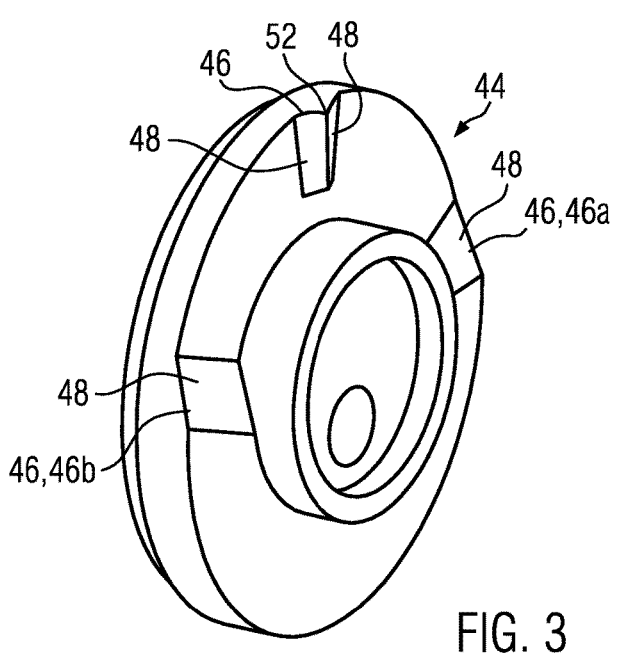
FIG. 3 shows a schematic perspective view of a cam carrier.

The design and the function of the adjustment mechanism 40 will be illustrated below with reference to FIGS. 1 to 3.

The adjustment mechanism 40 has a preferably spring-tensioned brake probe 42 and a cam carrier 44 attached to the base part 2 or the hoop part 6 which is provided with at least one hoop deflection cam 46. The brake probe 42 passes, in the course of the pivoting movement 8, across the hoop deflection cam 46 at at least one deflection position 47 whose position is determined by the position of the hoop deflection cam 46. A deflection position 47 can correspond to the position of the hoop part 6 parallel to the axis of rotation 20 or perpendicular to the assembly plane 22, represented in FIG. 1. Two further deflection positions 47a, 47b can each be located at the ends 12 of the pivoting region 10.

One hoop deflection cam 46 is formed by a projection having an at least approximately undulating design which includes at least one guide bevel 48.

The brake probe 42 and the at least one hoop deflection cam 46 are pressed against each other at least at one deflection position 47, 47a, 47b, preferably in a resilient manner. Here, at least the brake probe 42 is elastically deflected. Here, the cam carrier 44 can be pressed, in the region of a deflection position 47, 47a, 47b or a hoop deflection cam 46, resiliently against the brake probe, and/or the brake probe can be pressed, at least in the region of a deflection position 47, 47a, 47b or the hoop deflection cam 46, resiliently against the cam carrier 44. In the represented embodiment, the cam carrier 44 is, only by way of example, firmly fastened to the base part 2, in particular a bearing journal 38 or its front face 49, while the brake probe 42 is resiliently attached to the hoop part 6. The brake probe 42 can be designed as a resilient thrust piece, for example with a ball tensioned by a spring, or be itself designed as a spring, for example as a hoop-shaped leaf spring. Of course, the cam carrier 44 can also be arranged at the hoop part 6, and the brake probe 42 at the base part. For example, the cam carrier 44 can be, in a variant, attached to the exterior side of the hoop part 6 facing away from the base part 2.

If the cam carrier 44 is stationarily fixed with respect to the base part 2, for example fastened thereto, the at least one hoop deflection cam 46 projects in the direction of the hoop part 6. If, vice versa, the cam carrier 44 is stationarily fixed with respect to the hoop part 6, for example fastened thereto, the at least one hoop deflection cam 46 projects in the direction of the base part 2. Here, the at least one hoop deflection cam 46 can project radially to the inside or to the outside with respect to the pivot axis 4 or, as represented, project axially. Correspondingly, in such an embodiment, the brake probe 42 acts radially to the outside or to the inside, or axially on the cam carrier 44 or the hoop deflection cam 46, respectively.

In the represented embodiment, a deflection position 47a, 47b is located at one end 12 each of the pivoting region 10 of the pivoting movement 8 of the hoop part 6 with respect to the base part 2. One hoop deflection cam 46a, 46b is associated each with these two deflection positions 47a, 47b. If the hoop part 6 moves towards the ends 12, the brake probe 42 runs onto the guide bevel 46 of the respective hoop deflection cam 46a, 46b. Thereby, a deflection force or brake force directed against the pivoting movement is generated. A movement beyond the ends 12 of the pivoting region 10 can be blocked or only be possible with a very high expenditure of force.

By a hoop deflection cam 46 which is located within the pivoting region 10, a snapping-over of the hoop part 6 is generated at the deflection position 47 determined by the position of the hoop deflection cam 46. In the course of the relative movement between the brake probe 42 and the hoop deflection cam 46 or its apex 52, the brake probe 42 is initially, as with the hoop deflection cams 46a, 46b, increasingly deflected in a resilient manner, so that a deflection force 50 directed counter to the pivoting movement and away from the hoop deflection cam 46 is generated. When the apex 52 is passed, a snapping-over takes place as now the force generated by the brake probe 42 and the guide bevel 48 facing into the pivoting direction acts as a force that supports the pivoting movement, while the brake probe 42 rebounds. This procedure is independent of the direction in which the brake probe and the hoop deflection cam pass across each other. In order to create a clearly defined deflection position in which a snapping-over takes place over a preferably short path along the pivoting movement, the guide bevels 48, and preferably also the apex 52, are shorter than in the hoop deflection cams 46a, 46b at the ends 12 of the pivoting region 10. Of course, here, too, the braking and snapping-over behavior can be adapted to the respective application case via the length of the guide bevels 48 and the height and length of the apex 52 of a hoop deflection cam 46.

The cam carrier 44 can be embodied in the form of a circular segment or circular ring segment or in the form of a circular or annular disk. The cam carrier can extend in this case, at least in certain sections, around the pivot axis 4.

The cam carrier is fastened to the base part 2 or the hoop part 6 in a repeatedly releasable or repeatedly exchangeable manner, or by a fastening means 54, such as a screw.

Thereby, depending on the purpose of application, cam carriers with differently designed and/or positioned hoop deflection cams 46 and/or with a different number of hoop deflection cams 46 can be attached to one and the same base part or hoop part. For example, in one embodiment, hoop deflection cams 46a, 46b at the end of the pivoting region 10 and/or a deflection position 47 in the center of the pivoting region can be omitted. The hoop deflection cam 46 in the pivoting region 10 which causes a snapping-over of the hoop part 6 can be arranged at another point in another cam carrier 44, so that the deflection position 47 associated with this hoop deflection cam 46 is shifted. A plurality of snapping-over points can also be arranged at different deflection positions along the pivoting movement 8. By two adjacent hoop deflection cams, a locking for the hoop part 6 can moreover be generated, so that the latter is held between two deflection positions or hoop deflection cams 46. This makes sense, for example, if the hoop part is to be locked in a rest position pivoted away.

The cam carrier 44 is fastened to the front face 49 of the bearing journal 38. As represented, it can form a preferably flat disk arranged concentrically with respect to the pivot axis 4 which radially projects over the bearing journal 38 and covers the hoop part or the end 34 of one leg 32.

Thereby, the cam carrier 44 covers the bearing 39 formed by the opening 36 and the bearing journal 38 and prevents the soiling thereof.

The cam carrier 44 is held at the bearing journal 38 in a repeatedly releasable or exchangeable manner. This can be done, for example, by a fastening means 54, for example a screw. The cam carrier 44 can also be fastenable to the base part 2 or the hoop part 6 in different angular positions relative to the axis of rotation 4 to adapt the angular position of the deflection position to different assembly positions of the slinging device 1.

Of course, the disk-shaped cam carrier 44 can also be attached to the hoop part 6, in particular the ends 34. In this case, the brake probe 42 can be attached to the base part 2, in particular the bearing journal 38 or its end face 49.

The adjustment mechanism 40 can include two pairs of cam carriers 44 and brake probes 42 each, which are opposed with respect to the base part 2, preferably along the pivot axis 4.

If the brake probe 42 and the hoop deflection cam 46, 46a, 46b are radially opposed, the cam carrier 44 can also be designed as a sleeve.

The cam carrier 44 can also be arranged in a gap 56 between the hoop part 6 and the base part 2 or between the hoop part 6 and the retaining bolt 16 or nut 18, if there is sufficient space. In such a case, it can make sense for the cam carrier to only form a segment of an annulus or be divided into a plurality of ring segments, so that it is releasable or exchangeable when the hoop part 6 is mounted to the base part 2. Each one of the segments here preferably extends by less than 180° about the axis of rotation to permit such a subsequent assembly.

In the region between two hoop deflection cams 46, the brake probe 42 does not necessarily abut against the cam carrier 44, which somewhat reduces wear. However, just with large and heavy hoop parts, a braking effect can be also achieved in the regions between two hoop deflection cams 46 by a permanent abutment of the brake probe against the cam carrier 44, which facilitates the handling of such hoop parts since a portion of the own weight of the hoop part is absorbed by the brake effect generated thereby.

REFERENCE NUMERALS

1 slinging device
2 base part 4 pivot axis
6 hoop part
8 pivoting movement
10 pivoting angle or pivoting region
12 end of the pivoting movement
14 object, such as load or loading surface
16 retaining bolt
18 nut
20 axis of rotation
22 assembly plane
24 rotary motion
26 opening
28 slinging, load-securing, tensioning or lifting means
30 bow of the hoop part
32 leg of the hoop part
34 end of the leg
36 opening at the end of the leg
38 bearing journal
39 bearing
40 adjustment mechanism
42 brake probe
44 cam carrier
46, 46*a*, 46*b* hoop deflection cam
47, 47*a*, 47*b* deflection position
48 guide bevel
49 front face
50 deflection force
52 apex
54 fastening means
56 gap

The invention claimed is:

1. Slinging device (1) with a base part which is designed to be attachable to an object, such as a loading surface, with a hoop part which is attached to the base part so as to be pivotable relative to the base part about a pivot axis for slinging a slinging, load-securing, tensioning or lifting means, and with an adjustment mechanism including at least one hoop deflection cam and at least one brake probe that passes across the hoop deflection cam at least in certain sections at a deflection position with the pivoting movement between the hoop part and the base part, and which generates a deflection force which increases with decreasing distance from the at least one deflection position and which is directed counter to the pivoting movement, wherein the hoop deflection cam is arranged at a separate cam carrier attached to the base part or the hoop part.

2. Slinging device according to claim 1, wherein the cam carrier is arranged at the base part or the hoop part to be repeatedly releasable and/or repeatedly exchangeable.

3. Slinging device according to claim 1, wherein the cam carrier is fastened to the base part.

4. Slinging device according to claim 1, wherein the cam carrier is located at the side of the hoop part facing away, in the direction of the pivot axis, from the base part.

5. Slinging device according to claim 1, wherein the cam carrier is annular.

6. Slinging device according to claim 1, wherein the cam carrier extends around the pivot axis at least in certain sections.

7. Slinging device according to claim 1, wherein the cam carrier and the brake probe are pressed against each other in a resilient manner at least in a region around a deflection position.

8. Slinging device according to claim 1, wherein the brake probe is resilient.

9. Slinging device according to claim 1, wherein the hoop deflection cam is limited by at least one guide bevel.

10. Slinging device according to claim 1, wherein the cam carrier is seated on a bearing journal of the base part carrying the hoop part.

11. Slinging device according to claim 1, wherein the cam carrier covers a bearing between the base part and the hoop part.

12. Slinging device according to claim 1, wherein the base part with the hoop part attached thereto is fastened to a retaining bolt so as to be rotatable about an axis of rotation extending perpendicularly to the pivot axis.

13. Slinging device according to claim 1, wherein at least one deflection position is located spaced apart from the ends of a pivoting region of the pivoting movement of the hoop part opposite the base part.

14. Slinging device according to claim 1, wherein one deflection position each is located at an end of the pivoting region of the pivoting movement.

15. Exchangeable cam carrier, designed to be attached to a slinging device according to claim 1.

* * * * *